United States Patent [19]
Hobart et al.

[11] 3,866,140
[45] Feb. 11, 1975

[54] OPTICAL CAVITY FOR A LASER

[75] Inventors: James Lee Hobart; Wayne S. Mefferd, both of Palo Alto, Calif.

[73] Assignee: Coherent Radiation Laboratories, Palo Alto, Calif.

[22] Filed: Apr. 24, 1972

[21] Appl. No.: 247,201

Related U.S. Application Data
[62] Division of Ser. No. 778,072, Nov. 22, 1968, Pat. No. 3,683,297.

[52] U.S. Cl. .................... 331/94.5, 350/36, 350/50, 350/51, 350/288, 350/310
[51] Int. Cl. ........ H01s 3/02, H01s 3/22, G02b 5/08
[58] Field of Search ......... 331/94.5; 350/36, 50, 51, 350/288, 310

[56] References Cited
UNITED STATES PATENTS
2,940,359   6/1960   Rantsch .............................. 350/36
3,588,737   6/1971   Chow ................................. 331/94.5

OTHER PUBLICATIONS
Buynov et al., Soviet J. of Optical Technology, Vol. 34, No. 3, May–June 1967, pp. 273-274.

Primary Examiner—Ronald L. Wibert
Assistant Examiner—R. J. Webster
Attorney, Agent, or Firm—Limbach, Limbach & Sutton

[57] ABSTRACT

A folded gas laser having improved mirror mounting means in which: (1) optical alignment can be adjusted with two adjustable end mirrors without adjusting a corner block folding mirror assembly; (2) a ceramic corner block provides rigid and accurate support for folding mirrors while permitting direct water cooling of the corner block; (3) an improved mirror mount supports the mirrors in communication with the lasing medium, and (4) an improved orthogonal adjustment is provided for each end mirror consisting of a pivot pin, a pair of adjusting screws, and an antirotation strap.

2 Claims, 11 Drawing Figures

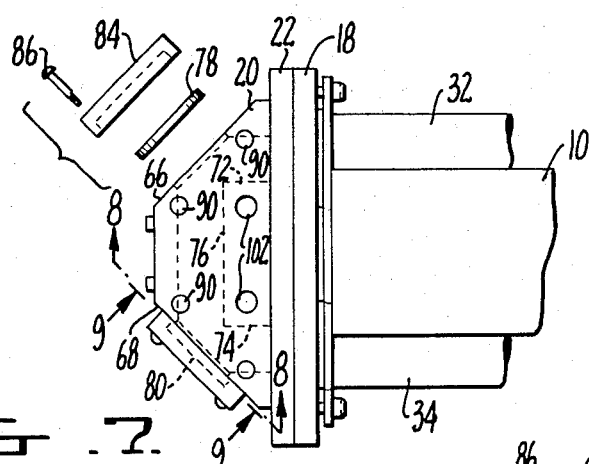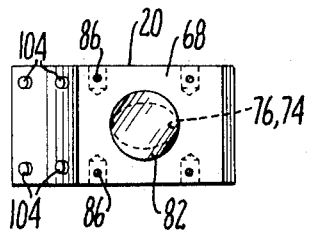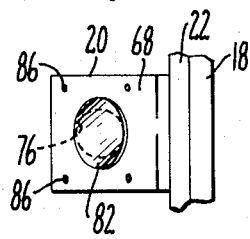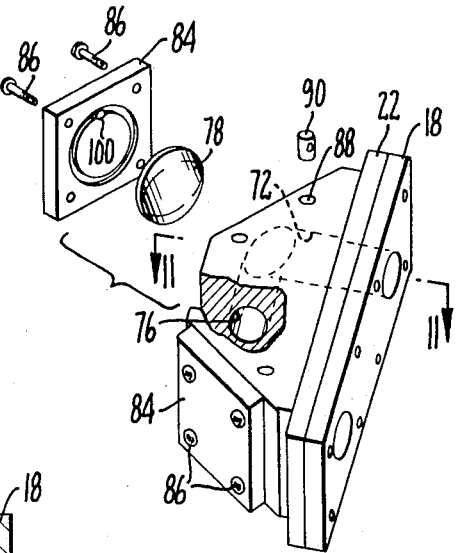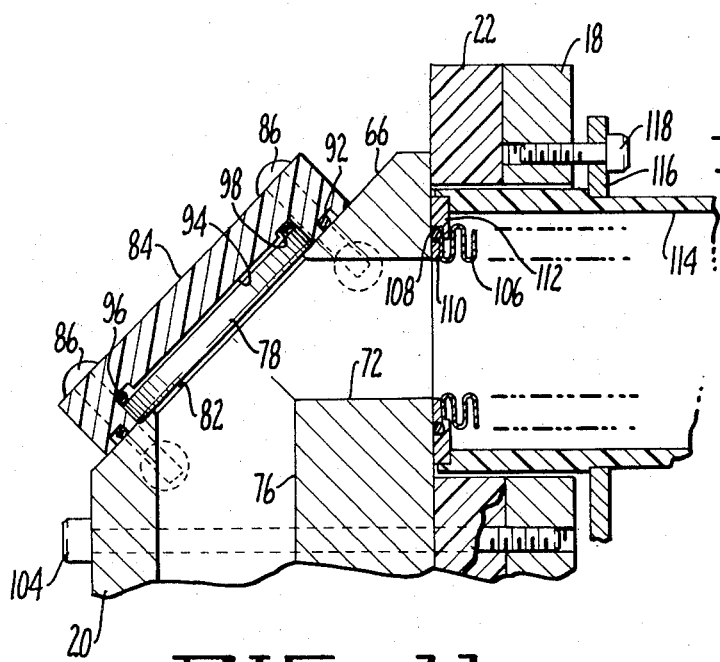

OPTICAL CAVITY FOR A LASER

This is a division of application Ser. No. 778,072, filed Nov. 22, 1968, now U.S. Pat. No. 3,683,297.

SUMMARY OF INVENTION

This invention relates to the structure of the optical cavity for a gas laser, and, while features of the invention can be used in other lasers, they are particularly useful in folded gas lasers where the lasing medium is electrically charged. A particular laser of this type is the Model 41 laser sold by Coherent Radiation Laboratories of Palo Alto, California where the lasing medium may be carbon dioxide, and the invention will be described in connection with that laser.

It is desirable in many types of lasers to obtain an output power for the laser beam which is as high as possible. Output power can normally be increased by increasing the length of the optical path along which stimulated emission takes place, but increasing the length of the laser makes the laser too bulky for efficient use in some situations. More importantly, increasing the length of the laser creates structural problems in the design and manufacture of lasers because of the need for precise geometrical alignment of the laser components and the need for preventing changes in that alignment during transportation and operation of the laser.

The problems resulting from increasing the length of the laser can be reduced by folding the optical path of the laser into two or more generally parallel legs by means of reflecting elements which reflect the optical axis of the laser along several connected paths which are supported on a single frame system. The additional reflecting elements, however, compound the problem of alignment which is already critical with the two reflecting elements customarily used in a laser.

In accordance with this invention, an efficient folded laser structure is provided where critical adjustments of the folding mirrors are avoided by rigidly mounting a pair of mirrors on an integral corner block where the two mirrors are supported on perpendicular faces of the block.

The corner block is made from an accurately machined piece of ceramic material such as Alumina which provides electrical isolation between folding mirrors and the laser cooling system.

Adjustment of the optical alignment of the laser can be obtained with a novel orthogonal adjustment for each of the end mirrors, the adjustment of which can compensate for small misalignment of the corner block in addition to misalignments of the end mirrors themselves. For this reason, no adjustment need be provided for the corner block though it is preferred to provide a single adjustment for pivoting the corner block about an axis which is perpendicular to the plane bisecting the included angle between the folding mirrors.

The novel orthogonal adjustment of each of the end mirrors, which may be employed to advantage in non-folded lasers, employs a pivot pin extending between, and preferably rigidly connected to, the mirror support body and the main structural body of the laser. Means such as an antirotation strap prevents relative rotation about the pivot of the mirror support body and the main laser body, and two adjusting screws adjustably connect the mirror support body and main laser body at locations spaced away from the pivot pin. The adjusting screws are positioned to subtend an angle of 90° at the pivot pin, and where the new adjusting means is used in a folded laser, the screws and pivot pins are so arranged that they provide a pivot axis for each end mirror perpendicular to a plane through the intersection of the folding mirrors.

The structure of the folded laser is also arranged so that the end mirrors and the folding mirrors are inside of the gas envelope of the laser thereby protecting the reflecting faces of the mirrors from contamination. Additionally, a new mounting arrangement is provided for the totally reflecting mirrors which eliminates pressure differentials across the mirrors so that even though the mirrors are inside of the gas envelope, they are not subjected to pressure differentials which might distort the mirrors and thereby upset the optical alignment of the device.

Other features and advantages of the invention will become apparent from the following description of the abovementioned Model 41 gas laser in which the improvements of this invention have been employed, it being understood that the structure of the Model 41 laser is but one embodiment of the invention. This embodiment is illustrated in the attached drawings in which:

FIG. 7 is a top plan view of the folding end of the laser as indicated at 7—7 in FIG. 1;

FIG. 8 and FIG. 9 are cross-sectional views taken along one of the mirror mount faces of the corner block of FIG. 7 illustrating the appearance of the corner block when viewed in the direction of the arrows 8—8 and 9—9, respectively, in FIG. 7;

FIG. 10 is a perspective view of the corner block of FIG. 7 with certain parts thereof partially removed, and FIG. 11 is a cross-sectional view taken along the plane at 11—11 in FIG. 10;

DETAILED DESCRIPTION

Figure 1:
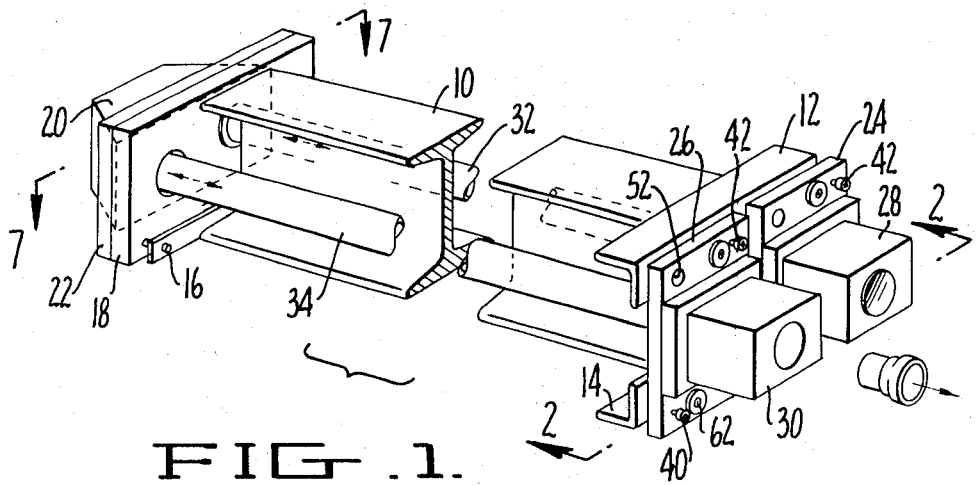
FIG. 1 is a perspective view of a laser constructed in accordance with this invention with certain conventional elements such as electrodes, power supplies, etc. having been omitted as will be apparent to one skilled in the art.
Figure 3:
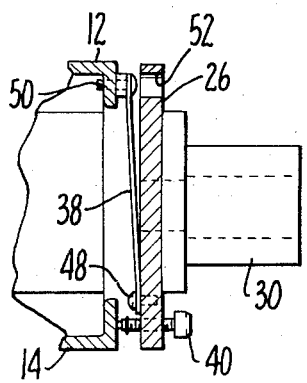
FIG. 3 and FIG. 4 are fragmentary sectional views taken along the planes indicated at 3—3 and 4—4, respectively, in FIG. 2.
Figure 4:
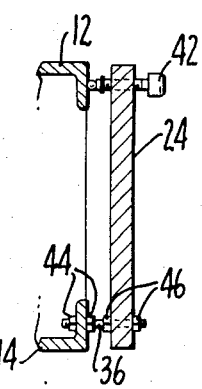

Referring now in detail to the drawings and particularly to FIG. 1, the laser illustrated therein includes a main structural body made of an I-beam 10 with a pair of angle irons 12 and 14 welded thereto at one end and a metal plate 16 welded thereto at the other end. A mounting plate 18 is mounted on one end of the structural body of the laser by means of a pair of screws (not shown) connecting the mounting plate 18 to the plate 16 and a third screw (not shown) extending through the mounting plate 18 into the end of the I-beam 10.

A corner block assembly 20 is mounted on the plate 18 as explained in greater detail hereinafter insulated therefrom by an insulator plate 22.

At the opposite end of the structural body of the laser, a pair of end mirror mounting plates 24 and 26 are mounted by means of an orthogonal adjusting mechanism described in detail below with a totally reflecting rear mirror assembly 28 mounted on the mounting plate 24 and a partially reflecting output mirror assembly 30 mounted on the plate 26. A pair of glass envelopes 32 and 34 extend along the sides of the I-beam 10 between the corner block 20 and the end mirror assemblies 28 and 30, respectively, and the envelopes 32 and 34 contain conventional electrodes, a medium capable of stimulated emission of radiation, and additional laser components known to those skilled in the art.

Referring to FIGS. 2–6, the orthogonal adjustment mechanism supporting each of the mirror mount plates 24 and 26 on the angle irons 12 and 14 include a pivot pin 36, an antirotation strap 38 (not shown for plate 24 in FIG. 2), and a pair of adjusting screws 40 and 42. The pivot pin 36 is made from a flexible and threaded pin which is rigidly attached to the angle iron 14 by means of two nuts 44 and rigidly attached to the respective mounting plates 24 or 26 by means of a pair of nuts 46.

The antirotation strap 38 is attached to the underside of the respective mounting plate 24 or 26 by means of a screw 48 and is attached to the angle iron 12 by means of a screw 50 access to which is provided through a port 52 in the mounting plate 24 or 26 so that the strap 38 prevents the mounting plate for the mirror from rotating about the pivot pin 36 with respect to the main structural body of the laser.

Figure 6:
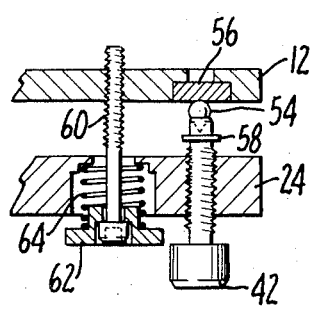
FIG. 6 is a fragmentary sectional view taken along the plane indicated at 6—6 in FIG. 2, it being apparent that the structure of FIGS. 2—6 is located at the end of the folded laser containing the "end mirrors"
Figure 5:
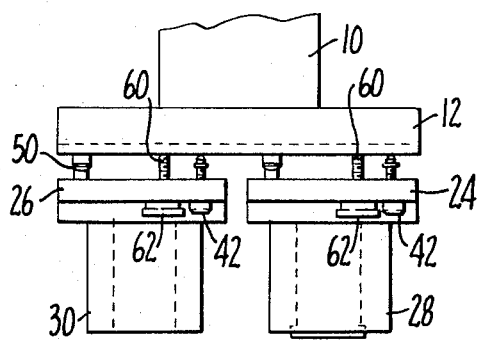
FIG. 5 is a top plan view of the apparatus of FIG. 2.

Each of the adjusting screws 40 and 42 are threadedly mounted in the respective mounting plates 24 or 26 as illustrated in FIG. 6, and the adjusting screw carries a hardened steel ball 54 on its inner end which engages an anvil 56 on one of the angle irons 12 and 14. The adjusting screws are also provided with snap rings 58 which limit the operating range of the screw.

As illustrated in FIG. 6, a spring mounting arrangement is provided adjacent to each of the adjusting screws 40 and 42 for resiliently urging the hardened ball 54 of that screw into engagement with its respective anvil. The spring support means comprises a screw 60 threadedly mounted in one of the angle irons 12 or 14 with the screw supporting a shouldered sleeve 62, and a compression spring 64 is mounted between the shouldered sleeve 62 and the respective mounting plates 24 or 26.

Figure 2:
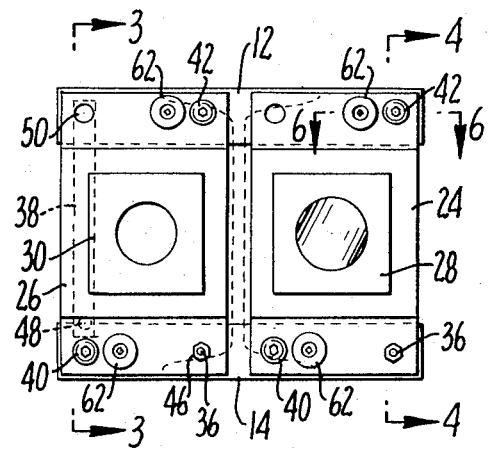
FIG. 2 is a cross-sectional view of the structure of FIG. 1 taken along the plane indicated at 2—2 in FIG. 1.

It will be noted from examination of FIG. 2 that each pair of adjusting screws 40 and 42 subtends an angle of 90° at their respective pivot pin 36. That is, a line drawn on FIG. 2 on the mounting plate 26 from the center of adjusting screw 40 to the center of pivot pin 36 will intersect at an angle of 90° the line drawn on that mounting plate from the center of adjusting screw 42 to the center of pivot pin 36. As a result of this arrangement, adjustment of the adjusting screw 42 will swing the mounting plate 26 about a horizontal axis in the plane of FIG. 2 through the centers of the pivot pin 36 and the adjusting screw 40. Similarly, adjustment of the adjusting screw 40 will swing the mounting plate 26 about a vertical pivot axis in the plane of FIG. 2 through the centers of the screw 42 and the pivot pin 36 without affecting the location of mounting plate 26 with respect to the above-mentioned horizontal axis. It should be noted in connection with pivotal movement of the mounting plates about the respective axes that the pivotal axis referred to does not pass along the face of the angle iron 12 or 14 because pivot pin 36 flexes at approximately its center. This does not introduce any substantial amount of inaccuracy into the adjustment, but where any potential inaccuracy of this type must be avoided, the pivot pin 36 may engage the angle iron 12 with a ball-anvil arrangement such as that used on the adjusting screws provided that additional means such as a second antirotation strap is provided to prevent rotation of the mirror mounting plate with respect to the main frame of the laser.

Referring to FIGS. 7–11, the corner block 20 is an integral body of Alumina ($Al_2O_3$) having a pair of mirror mount faces 66 and 68. A pair of parallel bores 72 and 74 extend through the block 20 from the faces 66 and 68, respectively, in alignment with the envelope tubes 32 and 34, and since the bores 72 and 74 are inclined with respect to the mirror mount faces 66 and 68 at 45° angles, the bores intersect those faces at elliptical openings. A transverse bore 76 extends between the elliptical openings where the two bores 72 and 74 intersect the mirror mount faces.

The mirror mount faces 66 and 68 are accurately machined onto the Alumina block 20 so that they are inclined to each other at an angle of exactly 90°, and a pair of folding mirrors 78 and 80 are mounted directly on the mirror mount faces 66 and 68, respectively, so that the two folding mirrors are inclined to each other at precisely 90°, and no error in tolerances in the manufacture of parts can influence this precise inclination of the mirrors other than errors in the machining of the Alumina block 20 itself. It will be recalled that the bores 72–76 intersect the mirror mount faces in elliptical openings, and for this reason, it might be possible to damage the reflecting surface of one of the folding mirrors if the mirror were rotated on the mirror support face. In accordance with this invention, such damage of the working portion of the mirror reflecting surface is avoided by providing in the mirror mount face a circular counter sunk area 80 surrounding the above-mentioned elliptical opening and having a diameter equal to the major axis of the elliptical opening. As illustrated in FIG. 11, the diameter of the folding mirror 78 is larger than the diameter of the circular counter sunk area 82 so that the reflecting surfaces of the mirror which are in engagement of the mirror support face 66 cannot be moved into alignment with either of the bores 72 or 76 even if the mirror 78 is rotated with respect to the mounting block 20.

The folding mirrors 78 and 80 are mounted on the block 20 by identical structures, and the structure employed for mirror 78 will be apparent from FIGS. 10 and 11. A cover plate 84 is mounted on the block 20 by means of four screws 86. The shanks of the screws 86 exetend into the block 20 as illustrated in phantom outline in FIG. 11 through appropriate bores larger than the diameter of the screws provided in the block, and the ends of the shanks of the screws 86 extend into transverse bores 88 which are drilled into the block from an adjacent face with a threaded insert 90 provided in each of the bores 88 to serve as a nut on the end of each of screws 86.

A compressible O-ring 92 is provided between the corner block 20 and the plate 84 to effect a gas seal therebetween. A central recess 94 is provided in the plate 84 having a depth greater than the thickness of the mirror 78, and compressible O-ring 96 in a groove 98 surrounding the central recess is compressed between the plate 84 and the mirror 78 resiliently supporting the mirror 78 against the mirror mount face 66. As illustrated in FIG. 10, a blind hole 100 having a diameter greater than the width of the channel 98 is drilled into the plate 84 providing a gas passageway around the O-ring 96 so that gas is free to move from behind the mirror 78 hence around the O-ring 96 to the space between the O-ring 96 and the O-ring 92 and hence along the interface between the mirror 78 and mirror mount face 66 to the reflecting side of the mirror 78 so that no air pressure differential is applied across the mirror.

As illustrated in FIG. 7, a pair of transverse bores 102 extend through the block 20 in non-intersecting relation with the other bores therein, and these bores 102 are connected into the circuit for water cooling liquid flowing through the laser so that the corner block may be cooled without permitting electrical conduction from the reflecting mirrors to the water cooling medium. This is a principal advantage of fabricating the corner block 20 from Alumina because it permits relatively impure water to be used as a cooling medium without danger of electrical discharge from the laser through the cooling medium.

The corner block 20 is mounted on the end plate 18 of the laser by means of four screws 104 which extend through the corner block from its back side hence through the insulator ring 21 into the mounting ring 18 as illustrated in FIG. 11. The bores 72–76 in the corner block communicate with the interior of the lasing medium envelopes 32–34 by means of a pair of metal bellows 106 which are joined to the envelopes 32 and 34 in conventional manner and which engage one face of the corner block 20 sealed thereto by means of an O-ring 108 clamped between a pair of spacers 110 and 112 with the spacer 112 compressed against the corner block 20 by means of a sleeve 114 held toward the block 20 by means of a ring 116 and three bolts 118 threaded into the mounting plate 18.

As explained above, the folding mirrors 78 and 80 of the laser are rigidly mounted on the corner block 20 in a manner in which their spatial relation to each other cannot be adjusted since that spatial relation is determined exclusively by the relative orientation of mirror mount faces 66 and 68. The entire mirror mount block may be pivoted about an axis which is perpendicular to the plane bisecting the included angle between the reflecting mirrors 78 and 80 by means of the screws (not shown) mentioned above by which the plate 18 is mounted on the I-beam 10 and plate 60. While the corner block can be adjusted in this way, adjustment of the corner block is not necessary to obtain optical alignment of the optical components of the laser since the necessary optical adjustment can be made with the orthogonal adjustments for the rear mirror assembly 28 and output mirror assembly 30.

While one specific embodiment of the invention has been illustrated and described in detail herein, it is obvious that many modifications thereof may be made without departing from the spirit of the invention as described in the appended claims.

What is claimed is:

1. In a laser having an optical path, a support body adjacent to said optical path, a pair of end mirrors mounted on said body at opposite ends of said optical path, and a lasing medium mounted on said body and extending along said optical path, the improvement comprising:
   A. at least one corner block mounted on said body for folding said optical path with said corner block comprising:
      1. an integral mass of ceramic material having a pair of exterior faces inclined to each other at an angle of 90°;
      2. a pair of generally parallel and spaced apart bores extending through said mass from said exterior faces and intersecting said exterior faces at generally elliptical apertures;
      3. a transverse bore extending through said mass and connecting said elliptical apertures, and
      4. a recess in each of said exterior faces the minimum width of which is at least as large as the maximum width of the elliptical aperture in said face,
   B. a mirror mounted on each of said exterior faces of said mass whereby said mirrors can be rotated without bringing into said elliptical apertures any surface of said mirror which was previously in engagement with said mass, and
   C. a mirror support means for each of said mirrors on each corner block comprising a mounting plate having on one side thereof a central area inside the periphery of said mirror and an outer area surrounding said inner area and outside the periphery of said mirror, a resilient O-ring positioned between said mirror and said one side of said plate between said central and outer areas thereof, a through passageway in said plate extending between said central and outer areas to permit gas flow therethrough;
   D. mounting means for mounting said plate on said ceramic mass with said O-ring compressed and with said mirror engaging said exterior face of said mass with said mounting means having a fluid seal between said ceramic mass and said outer area of said plate; and
   E. chamber means for containing said lasing medium, with said chamber means being in gaseous communication with said mirror and with said outer area of said plate, and being in gaseous communication through said through passageway, with the side of said mirror opposite to said block.

2. In a laser having an optical path, a support body adjacent to said optical path, a pair of end mirrors mounted on said body at opposite ends of said optical path, a lasing medium mounted on said body and extending along said optical path, and water cooling means surrounding said medium, the improvement comprising:
   A. at least one corner block mounted on said body for folding said optical path with said corner block comprising:
      1. an integral mass of ceramic material having a pair of exterior faces inclined to each other at an angle of 90°,
      2. a pair of generally parallel and spaced apart bores extending through said mass from said exterior faces, and
      3. a transverse bore extending through said mass and connecting said parallel bores at said exterior faces;
   B. a mirror mounted on each of said exterior faces of said mass C. a mirror support means for each of said mirrors on each corner block comprising a mounting plate having on one side thereof a central area inside the periphery of said mirror and an outer area surrounding said inner area and outside the periphery of said mirror, a resilient O-ring positioned between said mirror and said one side of said plate between said central and outer areas thereof, a through passageway in said plate extending between said central and outer areas to permit gas flow therethrough;

D. mounting means mounting said plate on said ceramic mass with said O-ring compressed and with said mirror engaging said exterior face of said mass with said mounting means having a fluid seal between said ceramic mass and said outer area of said plate;

E. chamber means for containing said lasing medium with said chamber means being in gaseous communication with said mirror and with said outer area of said plate and being in gaseous communication through said through passageway, with the side of said mirror opposite to said block; and F. water cooling means extending through said mass spaced apart from said bores and spaced away from said mirrors for cooling said mass and said mirrors while preventing electrical conduction along a path from said discharge to and through said water cooling means.

* * * * *